July 15, 1924.
L. R. ZEPKA
THEFT SIGNAL
Filed Dec. 20, 1922
1,501,296
2 Sheets-Sheet 1
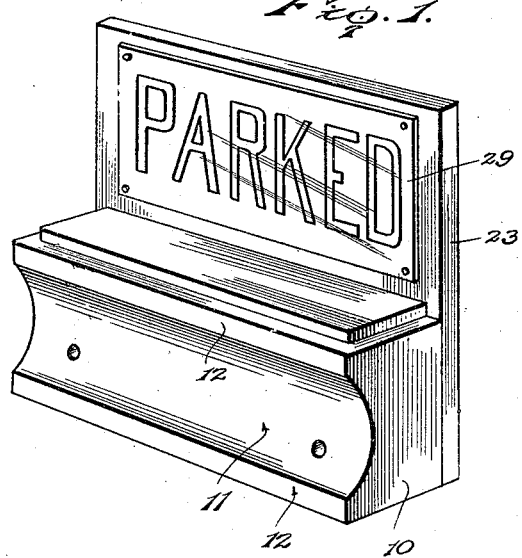
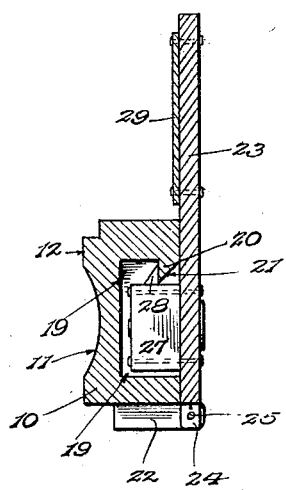
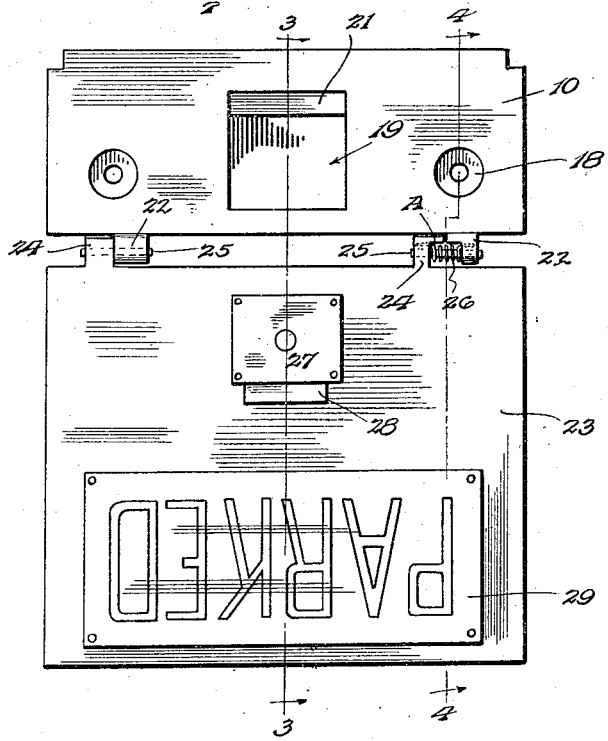
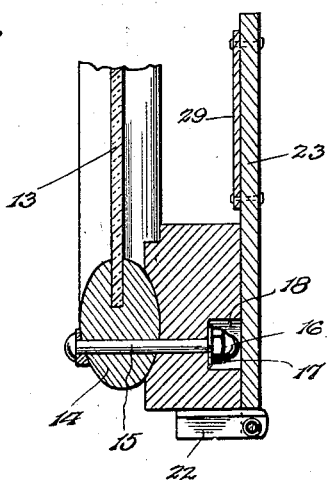
Inventor
L. R. Zepka.
By Lacey & Lacey, Attorneys

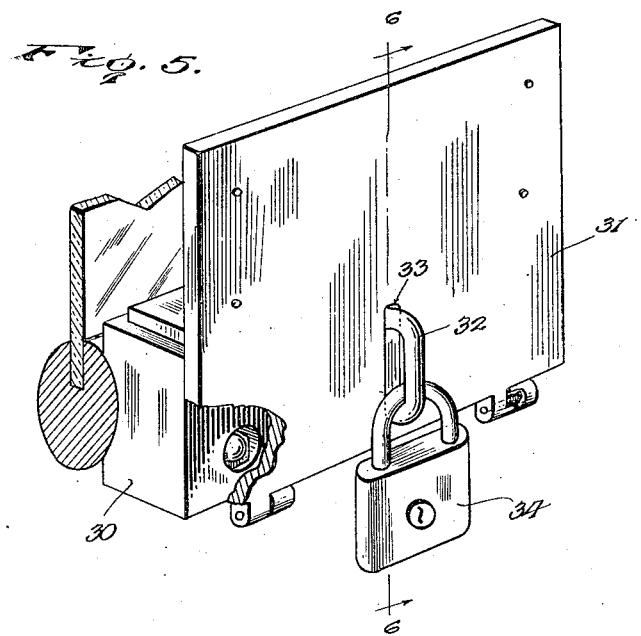
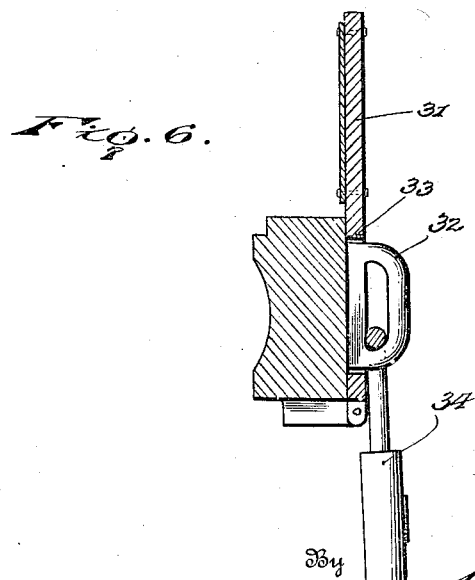

Patented July 15, 1924.

1,501,296

UNITED STATES PATENT OFFICE.

LUDWIG R. ZEPKA, OF CLEVELAND, OHIO.

THEFT SIGNAL.

Application filed December 20, 1922. Serial No. 608,008.

*To all whom it may concern:*

Be it known that I, LUDWIG R. ZEPKA, a citizen of the United States, residing at Cleveland, in the county of Cuyahoga and State of Ohio, have invented certain new and useful Improvements in Theft Signals, of which the following is a specification.

This invention embodies a device which may be attached to the wind shield of a motor vehicle to provide a theft signal for the vehicle, being adapted to display a warning signal when the owner or rightful driver of the vehicle is absent therefrom, and seeks, as one of its principal objects, to provide a device which will successfully combine the factors of extreme structural simplicity and entire efficiency in practical use.

The invention seeks, as a further object, to provide a device which may be readily applied to a wind shield rail.

And the invention seeks, as a still further object, to provide a device which, when the signal plate of the device is active, will be locked against removal from the wind shield.

Other and incidental objects will appear hereinafter.

In the drawings:

Figure 1 is a perspective view of my improved device showing the signal plate of the device active, Figure 2 is a rear elevation showing the signal plate inactive, Figure 3 is a sectional view on the line 3—3 of Figure 2, looking in the direction of the arrows, Figure 4 is a sectional view on the line 4—4 of Figure 2, looking in the direction of the arrows, Figure 5 is a perspective view showing a slight modification of the invention, and Figure 6 is a sectional view on the line 6—6 of Figure 5, looking in the direction of the arrows.

In carrying the invention into effect, I employ an oblong base block 10 which is preferably formed of metal and is provided at its rear side with a longitudinally extending concave channel 11 and at opposite sides of said channel with flat faces 12. In use, the device is preferably attached to the bottom rail of a wind shield and, in Figure 4, I have conventionally shown a wind shield at 13. The bottom rail of the wind shield is indicated at 14 and, as will be observed, the channel 11 of the base block is adapted to fit the rail. In mounting the device, suitable openings through the rail are provided and engaged through said openings are bolts 15 extending through the block. Threaded upon the bolts at their rear ends are nuts 16 beneath which are arranged lock washers 17 and, as will be observed, the nuts are accommodated in recesses 18 in the block. Since the rails of some wind shields are flat, the block is provided with the flat faces 12 to seat flat against a flat wind shield rail and, in this connection, it may be noted that the base block is mounted at the rear side of the wind shield so that the device will be conveniently accessible from within the vehicle. Formed in the block medially thereof is a recess 19 and depending from the top wall of said recess at the rear face of the block is a flange forming a strike plate 20 having a beveled face 21.

Formed on the block at its lower face are spaced forwardly directed lugs 22 and hinged upon said lugs is a signal plate 23. As particularly brought out in Figure 2, the signal plate is provided at its lower edge with spaced lugs 24 mating with the lugs 22 of the base block and engaged through said lugs are pivot pins 25 swingingly mounting the signal plate. Surrounding one of said pins is a spring 26 coacting at its ends with adjacent lugs of the base block and plate for normally swinging the signal plate downwardly to inactive position and as will be observed said lugs are notched at their confronting faces to accommodate the spring. Mounted upon the plate at its forward side is an appropriate lock 27 having a spring pressed bolt 28. Thus, as shown in Figure 3, the signal plate may be swung upwardly to active position, when the lock 27 will be received within the recess 19 of the base block while the bolt 28 will ride over the beveled face 21 of the strike plate 20 to engage behind said plate locking the signal plate active. The barrel of the lock projects, of course, through the signal plate, so that a key may be readily inserted in the lock for retracting the bolt and freeing the signal plate, when the spring will then function to again swing said plate downwardly to inactive position.

Riveted or otherwise secured upon the signal plate at its forward side is a sign plate 29 which may bear the word "Parked" or other suitable inscription and, if preferred, such inscription may be imposed directly upon the signal plate, eliminating the sign plate. Accordingly, as will be seen, when the signal plate is disposed in active position, the sign plate will be displayed at the rear of the wind shield for indicating the absence from the vehicle of the rightful driver or the owner thereof, and attention is now directed to the fact that when the signal plate is thus disposed in active position, said plate will overlie the recesses 18 in the base block covering the nuts 16 upon the bolts 15. Accordingly, access to these nuts will be impossible so that wrongful removal of the bolts and displacement of the device from the wind shield rail will be prevented.

In Figures 5 and 6 of the drawings, I have illustrated a slight modification of the invention wherein the base block of the device is indicated at 30 and the signal plate at 31. In this modification, the recess 19 in the base block, as employed in the preferred construction, is eliminated and in lieu thereof the base block is provided at its rear side with a rearwardly directed eye 32. The lock upon the signal plate, as illustrated in the preferred construction, is also eliminated, and in lieu thereof the plate 31 is provided with a slot 33 to freely accommodate said eye, so that the signal plate may be swung to active position having the eye projecting therethrough and engageable with the eye is an appropriate padlock 34 for securing the signal plate active. Thus, as will be seen, this modified form also provides a very efficient device and since the structure is otherwise identical with the preferred form of the invention, further description thereof is believed unnecessary.

Having thus described the invention, what is claimed as new is:

1. A theft signal for motor vehicles including a base block having a recess therein and formed with a flange extending into said recess, a signal plate swingingly mounted upon the block and movable to active position projecting beyond the block to display a signal, and a lock carried by said plate to be accommodated in said recess in the active position of the plate coacting with said flange securing the plate active.

2. A theft signal for motor vehicles including a base block shaped to fit a wind shield rail, a signal plate associated with the block and adapted to abut one face of the block projecting beyond the lines thereof in active position, and means for locking the signal plate active.

3. A theft signal for motor vehicles including a base block to abut a wind shield rail, means securing the block upon the rail and including removable elements exposed at one face of the block, a signal plate adapted to abut said face of the block in active position covering said elements, and means for locking the signal plate active.

4. A theft signal for motor vehicles including a base block to abut a wind shield rail, and provided at one face thereof with recesses, bolts extending through the rail and block into said recesses, nuts upon the bolts securing the block in position, a signal plate adapted to abut said face of the block in active position covering the recesses, and means for locking the signal plate active.

5. A theft signal for motor vehicles including a base block to abut a wind shield rail, means securing the block upon the rail and including removable elements exposed at one face of the block, the block being provided at said face thereof with a recess, a signal plate swingingly mounted upon the block and movable to abut said face thereof in active position covering said elements, and a lock mounted upon the plate at its inner side and adapted to be received in said recess coacting with the block for securing the signal plate active.

In testimony whereof I affix my signature.

LUDWIG R. ZEPKA. [L. S.]